Oct. 15, 1963  R. C. CROOKS  3,106,838
WELDED JOINT TESTER
Filed Dec. 14, 1959
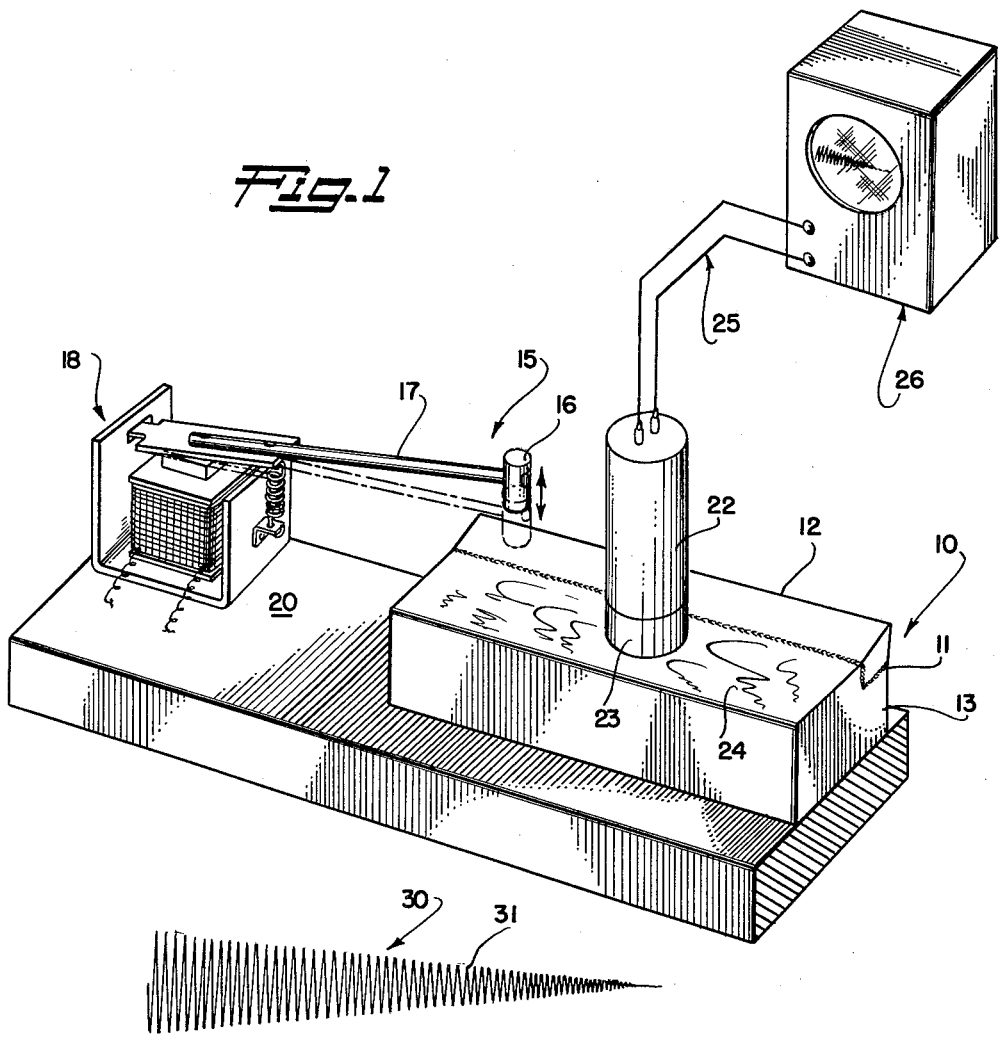
*Fig.1*
*Fig.2*
*Fig.3*
INVENTOR.
ROBERT C. CROOKS
BY 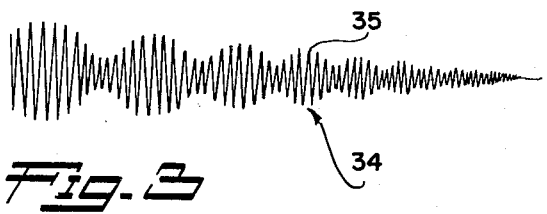
Agent

United States Patent Office

3,106,838
Patented Oct. 15, 1963

3,106,838
WELDED JOINT TESTER
Robert C. Crooks, Temple City, Calif., assignor to
Lockheed Aircraft Corporation, Burbank, Calif.
Filed Dec. 14, 1959, Ser. No. 859,407
3 Claims. (Cl. 73—67.2)

This invention relates to a device and method for testing welded joints. In machines which have two metal members which are welded together which are placed under high strain in the operation of said machine, it is imperative to know the condition of the welded joint between the metal members therein. Unexpected failure at welded joints has caused long expensive shutdowns, great damage to the machine and to surrounding personnel. Many different methods and means have been attempted to detect imperfectly welded joints which might fail under future stress.

One such prior method of inspecting of welded objects, called a radiographic process, involved using X-rays or gamma rays to penetrate the weld. This involved directing short X-rays or gamma rays through the two members welded together, with a fluoroscope screen or a photographic film on the opposite side. The theory was that the fluoroscope or the film would show light areas approximately where there was a void in the weld. This had the obvious disadvantage of being extremely expensive and where film was used, there was delay in developing the film which necessitated some means whereby each piece of film would be identified with its respective inspected object. Where a fluoroscope was used, it was possible to identify the piece being inspected immediately but the expense involved was great. Where the material of the weld had an appreciably different density from the metal members being welded together, readings were erroneous. A further basic problem with the radiographic method of inspection involved protection of personnel operating the inspection device from radiation. Short wave radiation is extremely dangerous to human beings and much shielding is necessary.

Another prior inspection method involved magnetic particle process, more commonly known as magnafluxing. The principle behind magnafluxing was that a void such as might occur in a bad weld would alter the lines of magnetic force being passed through the metal piece. An indicating medium, such as iron filings, was applied to the surface of the object to be inspected. The medium would follow the lines of magnetic force with sharp deviations from the normal pattern indicating a crack or a void. Disadvantages of this method were that it was only effective where the materials of the metals and the welds were ferro-magnetic and great experience was necessary to interpret magnetic field patterns. The operator must know how to place the magnetic force in the right direction and must have experience with how to read the magnetic lines of force as indicated by the indicating medium. This method also involved extensive equipment. Only surface cracks could be detected and where the material of the weld was something like a braze, it was completely ineffective.

Another prior method of inspecting welds involved the use of ultrasonic inspection devices. The theory of operation is similar to that of radar. Ultrasonic sound waves were transmitted into the end of the welded members on a side parallel to the weld and if the object was perfect, would be reflected off of the far end of the other welded member and picked up at the originating end and displayed on an oscilloscope. If there was a defect in the weld, the sound wave was reflected at the flaw and shown on the oscilloscope. Disadvantages with this method of inspection involved the requirement of a high-frequency sound source and restriction to the types of welds being inspected. The problem was again that if there was a sufficient difference in density of the weld material from that of the welded members, there was reflection of sound waves at that point regardless of defect.

It is an important object of this invention to provide a means for detecting flaws in welded joints between two metal members by a method which is simple and involves inexpensive devices. The device, according to the present invention and the method, utilized an oscilloscope, a vibration pick-up probe and a simple means to vibrate the metal parts, all of which are standard equipment.

It is another important object of this invention to provide a means to detect flaws in welded joints which require little experience at the hands of the operator. The operator need only know how to operate an oscilloscope and how to read simple display patterns on it.

FIG. 1 shows the means by which the method according to the present invention is carried out.

FIG. 2 shows the oscilloscope pattern of a perfect weld.

FIG. 3 shows the pattern seen on the oscilloscope when the weld is defective.

Any object has a harmonic vibration frequency determined by its size and material. The present method utilizes this harmonic frequency to determine whether there is a flaw in a connection between two metal members. By striking a metal member, it will vibrate or ring at a relatively high frequency. If two metal members are joined together by a perfect weld, they will vibrate as one piece. A tap of one of the members will cause the other to vibrate with it smoothly. If there is a defect in that welded connection between the two metal parts, each will tend to vibrate at its own harmonic frequency and there will be an interference at the point of defect with a strong likelihood that they will be out of phase, resulting in a vibration of fluctuating frequency and amplitude.

The present device uses a tapping means to set into vibration one of the two welded members, a device to pick up the vibrations in the other of the welded members and an oscilloscope on which to display the relatively high frequency vibrations from the two members. It will be seen that a single tap will cause the members to vibrate at a high amplitude at first, gradually decreasing then to the static state. Thus, if a tapping of a relatively low frequency is utilized, the oscilloscope can be synchronized so that it will display a single horizontal sweep or frame on the scope for each tap.

FIG. 1 shows the testing mechanism in simplified form. For purposes of example, the weld 11 to be tested is shown here on machine blade 10 between cutter tip 12 and its insert 13. It is usual to use a braze-type weld in a machine blade as shown but the present method is not restricted to testing of brazed joints. A hammer 15 comprised of an arm 17 and a head 16 is operated by solenoid 18. It taps one of the two members which are welded together, in this case the cutter tip 12, to set up a relatively high frequency harmonic vibration in that member. The solenoid 18 is actuated at a frequency between two and eight cycles per second which allows enough time for the member to return to static state before being tapped again. The welded object 10 is placed upon a support, such as wood base 20, which will not absorb the vibrations and will allow free harmonic vibration of the welded object 10.

The vibrations in one of the two members, such as cutter tip 12, will cause the other of the two members shown here as the insert 13 to vibrate with it at differing efficiencies depending upon the perfectness of the weld. If the weld is absolutely perfect, they will vibrate as a single piece at the frequency of a piece the size of the welded object regardless of the intervening weld. If there is an imperfection or flaw in the weld, the vibrations from the tip 12 will be transferred to the insert 13 which will attempt to vibrate at its own harmonic frequency as will the tip 12 at those places where the weld is imperfect. These vibrations occuring in varying phase relationship will tend to interfere with each other, amplifying in some instances and damping the vibrations in others. The vibrations are detected in the welded member not being tapped, insert 13, and displayed on an oscilloscope 26.

The probe 22 is used to detect the vibrations. It utilizes a crystal 23, such as barium titanate, which responds to the vibrations to produce an electrical current relative to the vibrations. In order that the detecting probe 23 have a firm connection with the member 13 in which the vibrations are being detected, an oil film 24 is used to make a vacuum-tight connection. The electrical current is transmitted through lines 25 to the oscilloscope 26.

The oscilloscope 26 is synchronized with the frequency of the tapping of hammer 15 so that a sweep from left to right on the scope will equal the time interval between taps of hammer 15. Thus, the vibration pattern from each tap may be observed in expanded form across the width of the scope from the beginning to its fadeout.

FIG. 2 shows the evenly damped envelope 30 of the vibrations of a welded object which has a perfect weld. Note that the envelope 31 is smoothly damped from left to right. This is the pattern of vibrations of a homogeneous object resulting from a single tap.

Defective pattern 34 of FIG. 3 has an intermodulated envelope 35 due to the accentuation of the phase relationship at the wider modes and the interference of phase relationship of the vibrations in the necked down areas of the envelope 35. By measuring the height of the widest part of the mode and comparing it to the narrow part and measuring the frequency of the vibrations, it can be determined how many defects exist in the weld and of what magnitude.

It can be seen that the method presented is simple, inexpensive and requires little training to use. It is believed that it will materially aid those who will produce such welded objects such as the machine blade shown. Sale of defective machine blades results in great cost in their return and much damage to the reputation of the manufacturer.

Having disclosed the details of my device, I claim the following steps, combinations of elements and their equivalents as my invention for which I wish to be protected by a U.S. Letters Patent.

What is claimed is:
1. A method of testing the quality of the connecting weld between two metal members including the steps of striking one of said metal members at a frequency between two and eight cycles per second, the frequency being controlled to insure that vibrations induced by one strike have substantially terminated prior to the next strike, detecting the vibrations in the other metal member, transducing said detected vibrations to an electrical signal and transducing said electrical signal to visual intelligence wherein frequency and amplitude fluctuations are visually displayed resultant from weld imperfections.

2. A method for testing the continuity of welded joints comprising striking by means out of mounting contact with the test material and at a predetermined frequency one of the two members welded together so as to induce vibrations therein, the strike frequency permitting induced vibrations to substantially terminate between strikes, detecting the resultant vibrations in the other member, and transducing said detected vibrations into readable intelligence wherein frequency and amplitude fluctuations are visually displayed resultant from weld imperfections.

3. A device to test a weld between two metal parts comprising hammer means controllable to strike one of the metal parts so as to cause the metal of said one part to vibrate at its free harmonic frequency, the striking frequency of said hammer means being sufficiently low to allow the metal to become substantially static between strikes, mounting means adapted for retaining the position of said hammer means relative to and out of contact with the welded metal, said mounting means being of a material allowing the metal to vibrate at its free harmonic frequency, means mountable upon the other metal part to detect vibrations induced therein, means to transduce the detected vibrations into an electric signal, an oscilloscope, means connected between said transducer means and said oscilloscope to apply the electric signal to said oscilloscope, the sweep frequency of said oscilloscope being synchronized with the frequency of said hammer.

References Cited in the file of this patent

UNITED STATES PATENTS

| | | |
|---|---|---|
| 2,393,225 | Andalikiewicz | Jan. 22, 1946 |
| 2,412,240 | Williams et al. | Dec. 10, 1946 |
| 2,486,984 | Rowe | Nov. 1, 1949 |
| 2,532,507 | Meunier | Dec. 5, 1950 |
| 2,635,746 | Gordon | Apr. 21, 1953 |